United States Patent Office 3,228,469
Patented Jan. 11, 1966

3,228,469
PREVENTING AND CURING LOST CIRCULATION
Loyd R. Kern, Irving, Thomas K. Perkins and Thomas F. Moore, Dallas, and William J. McGuire, Jr., College Station, Tex., assignors to The Atlantic Refining Company, Philadelphia, Pa., a corporation of Pennsylvania
No Drawing. Filed Dec. 17, 1962, Ser. No. 244,882
19 Claims. (Cl. 166—29)

This invention relates to curing lost circulation encountered during the drilling of earth boreholes for oil and gas production. More specifically, this invention pertains to a method of and a composition for curing lost circulation utilizing a fluid-solid slurry especially notable for its ability to rapidly form a thick filter cake possessing properties specially selected for curing lost circulation.

In drilling oil and gas wells, it is customary to employ a drilling fluid which is circulated through the drill string and borehole. Usually, the drilling fluid is a chemically treated fluid suspension of weighting materials which control the density of the mixture and fluid loss control agents which reduce the fluid loss of the mixture. It is standard practice to maintain the density, or hydrostatic pressure, of this drilling fluid on the formation at a level that prevents entry of fluids in the formation into the borehole. The hydrostatic pressure of the drilling fluid, therefore, generally exceeds the formation pressure and there exists a pressure differential between the formation and drilling fluid in the borehole. Although the drilling fluid contains solids, the fluid suspension has selected rheological properties so that it essentially performs as a fluid. As a fluid, the drilling fluid tends to leak off to the formations traversed by the borehole because of the pressure differential between the drilling fluid and the formation. Leak off of the drilling fluid causes the fluid loss control material and weighting material to form a filter cake on the face of the formation. This filter cake acts as a barrier to additional fluid loss by reducing the effective formation permeability. When a zone of lost circulation is encountered, the fluid loss control materials are not capable of preventing loss of the drilling fluid into the zone of lost circulation and lost circulation occurs. It then becomes necessary to quickly and effectively plug and seal the lost circulation zone for obvious reasons well known to those skilled in the art.

It is believed that lost circulation is caused when weak formations are fractured by hydrostatic and dynamic pressures exerted by the drilling fluid. Once the fracture forms, if the drilling fluid can enter the fracture, the pressure necessary to extend and widen the fracture is less than that required to initiate the fracture because the drilling fluid acts like a wedge and exerts pressure against the walls of the fracture. Once the fracture is created, the drilling fluid flows into the fracture until the pressure in the borehole is reduced or until the large amount of drilling fluid lost in the fracture has enough gel strength in the crack to offset the pressure tending to extend the fracture.

Many methods have been proposed for curing lost circulation. One method is to use solids carried in a fluid carrier to the zone of lost circulation. Many such solid-fluid mixtures have been suggested and all are designed to plug and seal quickly with a minimum of fluid loss and filter cake. In employing such mixtures, the operators rely solely on the inherent plugging properties of the materials and inject a batch of this mixture into the borehole in the hope that the material will plug the zone of lost circulation. It has been found, however, that when lost circulation is caused by a fracture in the formation that such methods and mixtures are extremely unreliable and seldom effective unless inordinately large amounts of such mixture and extreme waiting periods are employed. Such mixtures and methods, moreover, frequently provide only a temporary cure since the plug is a mixture of fluid and solids which reopens or cracks as the mixture dehydrates and pulls away from the walls of the formation or fracture.

In addition, heretofore, it was generally thought that lost circulation occurred in porous or permeable zones, but it has been found that in many areas that lost circulation occurs in relatively impermeable shale or sandy shale zones. The permeability of the lost circulation zone and its effect on curing and preventing lost circulation has not heretofore been realized in remedying lost circulation and, if they worked at all, prior art compositions were only suitable for permeable zones. These prior art compositions are designed to deposit a relatively thin, impermeable filter cake as the lost circulation control mixture leaks fluid into the porous zone through the walls of the fractured lost circulation zone. When, however, the walls of the fracture are impermeable, these prior art compositions will not lose their fluid, the suspension will continue to flow like a fluid, and the mixture will not readily cure the zone of lost circulation. This invention, however, discloses techniques and compositions suited for both permeable and impermeable zones.

Today, there is also needed a lost circulation control system wherein potential zones of lost circulation are remedied as well as zones already suffering lost circulation. This invention describes such a system.

In general, this invention accomplishes the above needs with a fluid-solid mixture that rapidly forms a thick filter cake that, if employed in accordance with the techniques described in this invention, will permanently plug the zone of lost circulation by forming a filter cake in the fractured zone upon which a low fluid loss drilling mud will form an impermeable mud cake. The filter cake of the invention will not dehydrate nor compress nor crack with time and will not reopen to lost fluid again. This invention, therefore, provides a fluid-solid mixture having special filter cake forming properties. This rapid filter cake forming mixture (a filter cake test thickness of at least 4 inches) is injected into the fracture to fill the fracture with an extra permanent filter cake. The fracture will not reopen during subsequent drilling operations. Preferably, in a more specific embodiment of this invention, the mixture is injected slowly and in stages with up to about half of the mixture forced into the fracture at a low rate (one-fourth b.p.m. to two b.p.m.) and the pumping ceased for a period of at least 15 minutes. A small dose of additional mixture is then forced into the fracture at such low rate and the pumping again ceased. Preferably, this procedure is repeated until the pressure required to force the mixture into the fracture increases to a value greater than will be exerted later by the drilling fluid during subsequent drilling operations. In another aspect of this invention, lost circulation is prevented by deliberately subjecting each potential zone of lost circulation to a pressure as great as the maximum expected mud pressure and curing any fracture caused thereby. In yet another aspect of this invention, the process for curing lost circulation first involves removing low water mud cake from the zone of lost circulation before applying the lost circulation control mixture of this invention. In still another aspect the zone of lost circulation is pretreated with fresh water before applying the lost circulation control mixture. Other aspects of this invention are directed to specific compositions and variations in methods employing these compositions as hereinafter described.

Accordingly, one object of this invention is to provide methods and compositions for depositing a thick, relatively dehydrated filter cake to seal a zone of lost circulation.

Another object is to provide a lost circulation control mixture of increased water loss and rate of filter cake deposition.

Still another object of this invention is to provide methods and compositions for curing lost circulation in impermeable zones by forming a relatively permeable bridge within the fracture of the lost circulation zone which bridge acts like a screen on which a thick filter cake is deposited and through which the filter cake is dehydrated.

Another object of this invention is to provide methods and compositions for curing lost circulation in a porous formation wherein the low-water-loss filter cake deposited by the drilling fluid on the walls of the fracture of the lost circulation zone is removed or degraded prior to injection of the lost circulation control mixture of this invention.

A further object of this invention is to provide a lost circulation control mixture for shale formations wherein prior to injection of the lost circulation control mixture of this invention there is injected fresh water to hydrate and strengthen the shale.

Still another object of this invention is to provide a lost circulation control mixture which minimizes the volume of material needed to permanently cure the zone of lost circulation.

Yet a further object of this invention is to provide techniques for quickly and efficiently depositing a filter cake in a zone of lost circulation so as to form a permanent plug which will withstand future drilling pressures and which is dehydrated to the extent that it will not compress or crack and will not reopen to lose fluid again.

A further object of this invention is to provide a system for preventing lost circulation wherein each potential zone of lost circulation is deliberately subjected to fracturing pressures exceeding anticipated mud pressures and any fractures caused thereby are sealed. Preferably, these fractures are sealed with a dehydrated filter cake which will withstand future hydrostatic and dynamic pressures exerted by the drilling fluid.

Another object of this invention is to deposit in a zone of lost circulation a filter cake of sufficient shear strength to prevent further extension or widening of the zone of lost circulation with time.

The above and other objects of this invention are accomplished with a lost circulation control mixture that acts both as a well control fluid and as a lost circulation curing fluid without sacrificing the desired rheological and well control properties of more standard drilling fluids.

As stated previously, it has been found that lost circulation primarily occurs when a zone is fractured by the pressures exerted by the drilling fluid. It has been found that to effectively and efficiently prevent further loss of drilling mud into this fractured zone that it is necessary to deposit a thick, dehydrated filter cake in the fracture. To accomplish this objective, it is first necessary to employ a fluid-solid mixture that deposits a filter cake that forms quickly, dehydrates quickly and withstands future mud pressure. Second, even though such mixture has obvious advantages per se over standard lost circulation control materials, such fluid-solid mixture should be employed in a special manner as hereinafter set forth.

Consider now the general nature of such mixture remembering that such nature is specially selected for curing lost circulation in fractured zones and is especially suited to the methods of curing lost circulation as hereinafter set forth. The lost circulation control mixture of this invention is one that has the ability to form a thick, a permeable and a dehydrated filter cake in a rapid manner. The control mixture has the added advantages of being able to accomplish these results in an efficient manner as measured in time, volume and effectiveness. The essential features of this control mixture are that it forms a thick filter cake per unit of volume and that such filter cake is readily physically dehydrated. The mixture must have a filter cake test thickness of at least 4 inches. If the fluid-solid slurry forms a filter cake test thickness of at least 4 inches, the slurry will generally have all of the qualities just mentioned provided that it is employed in accord with the procedure set forth hereafter. Filter cake test thickness as employed herein is a modified value determined from test values obtained in accord with the procedures for conventional low pressure testing of drilling fluids as described by the American Petroleum Institute in a publication entitled, "API RP29, 4th edition, May 1957, Recommended Practice, Standard Field Procedure for Testing Drilling Fluids." Conventional API test equipment employs a 100 cc. sample and the filter cake thickness and fluid loss for a thirty minute run are reported. Shorter run times are frequently employed and it is standard practice to project the shortened run data to the desired thirty minute run time by plotting the fluid loss versus the square root of time and drawing the best straight line through the points. The filter cake thickness corresponds to the volume of fluid loss, and the lost circulation control mixture will have a fluid loss of 300 cc. or more in the above-described thirty minute modified API test. The lost circulation control mixture of this invention forms a much thicker filter cake and has a much greater rate of fluid loss than heretofore anticipated when designing test equipment for earth drilling and related fluids; therefore, due to the limited size of the test equipment, short runs are made and the results are then projected to thirty minutes. These projected values are used herein as the filter cake test thickness and corresponding fluid loss. These values show that the fluid-solid mixture of this invention has especially high filter cake forming properties per unit of volume. The filter cake, in addition to forming quickly, is readily physically dehydrated since the rate of fluid loss through the cake remains high as the filter cake thickness increases. This is in contrast to standard lost circulation control fluids which lose fluid only as the filter cake forms Once the cake is formed, the rate of fluid loss decreases appreciably and rapidly and the rate at which additional filter cake thickness forms is very slow. These fluids do not continue to build up a thick filter cake once the initial layer is formed and these filter cakes are not readily physically dehydrated. On the other hand, the lost circulation control mixture of this invention forms a filter cake test thickness greater than four inches and the rate of fluid loss through and from the cake is high so the ability to physically dehydrate remains high when the cake is deposited in the lost circulation zone. The filter cake of this invention even after it is dehydrated (water compressed out of cake) will allow added amounts of filter cake to be deposited thereon and dehydrate through the cake already deposited.

In addition to forming a thick filter cake, the lost circulation control mixture must have the necessary rheological and well control properties needed for deep earth borehole drilling. It is difficult to find suitable mixtures having the properties set forth herein which still retain the needed rheological and well control properties. Most standard mixtures of solids and fluid having the needed well control and rheological properties have relatively low water loss and thin filter cake forming properties. For example, a typical weighting material for drilling mud is barite and it was found that when barite was used in the lost circulation slurry of this invention that the filter cake thickness was much lower than desired because the water loss was too low. Experimentation proved that commercial barites exhibited varying fluid loss properties. It was postulated that the variations were due to natural clay contaminants in the barites and that sodium chloride would improve the consistency of the fluid loss properties of barite and make barite a suitable weighting material for the lost circulation control mixture of this invention when it would otherwise be unsatisfactory. This proved conceptually correct. By way of illustration, ten pounds of sodium chloride decreased the time for a 16 pound per gallon barite slurry to lose 50 cc. of water and build a five-eighths inch filter cake from 46 seconds to 17 seconds. Generally, it was found best to add sodium chloride before forming the mixture and generally, the amount of sodium chloride added per barrel of water will be about 10 pounds or between 5% and 15% of saturation. Similar problems and considerations are present in selecting the size, and concentration of the other solid particles in the lost circulation control mixture of this invention. Such problems and selections do not lend themselves to detailed discussion here since the relationships between the solids, the fluid, the density and other properties are controlled by factors depending upon the particular material selected and well bore conditions involved. These are governed partially by principles well known to those skilled in the art. Such conditions are best illustrated by the examples of specific lost circulation control mixtures as shown in Table I. The solid particles in the mixture when deposited in the zone of lost circulation must be able to withstand a pressure differential across the deposited particles of at least 1500 p.s.i. and preferably the deposited particles will withstand pressure differentials exceeding 3000 p.s.i. The filter cake test thicknesses and fluid loss properties measured in accordance with the procedures set forth previously are given below in Table I, together with the ingredients and amounts thereof for an eighty barrel mix.

TABLE I

*Mixtures for curing lost circulation*

[Final mix: 80 bbls.]

| | | | | | |
|---|---|---|---|---|---|
| Mix wt., lb./gal | 10.5 | 13.0 | 13.3 | 15.2 | 16.0 |
| Water, bbl | 60.2 | 49.6 | 53.0 | 47.5 | 54.2 |
| Filter cake, in./30 min | 7.0 | 13.3 | 8.8 | 10.4 | 7.5 |
| Fluid loss, cc./30 min | 360 | 560 | 370 | 490 | 400 |
| Barites, 100 lb. sacks | 70 | 25 | 84 | 266 | 311 |
| Sodium chloride, lb | 885 | 742 | 790 | 713 | 813 |
| Solids, lb.: | | | | | |
| Vermiculite | -------- | -------- | -------- | 553 | 312 |
| Expanded perlite | -------- | 18,480 | -------- | 10,868 | -------- |
| Attapulgite | -------- | -------- | 410 | -------- | 205 |
| Diatomaceous earth | 5,486 | -------- | -------- | -------- | 2,904 |
| Pozzolan | -------- | -------- | 16,800 | -------- | -------- |
| Coarse almond shells | 1,204 | -------- | -------- | -------- | -------- |
| Cotton linters, wool and wood chips | 120 | -------- | -------- | -------- | -------- |
| Hog hair | 181 | -------- | -------- | -------- | -------- |

The aforementioned lost circulation control mixtures of this invention are employed in the basic process to cure a fractured zone of lost circulation. The process deposits an initial layer of filter cake in the fractured lost circulation zone, allows this layer of filter cake to physically dehydrate, and deposits additional layers of filter cake while compacting the filter cake until enough filter cake is deposited to seal the fracture to permanently withstand future mud pressures. This remedial process comprises mixing the desired volume of lost circulation control slurry which volume depends on the location of the zone of lost circulation, the size of the borehole, the location of the casing and like factors. Generally, the volume will exceed 80 bbls. The batch of mixture is injected into the borehole and spotted opposite the zone of lost circulation by pumping a second drilling fluid after the mixture. It is usually practice to inject enough of the second fluid to clear the drill pipe of the lost circulation mixture. Thereafter, a part of the batch of mixture is forced at a slow rate not exceeding two barrels per minute and more preferably at about ¼ barrel per minute into the lost circulation zone. Preferably, fluid-solid mixture will be forced into the fracture until the pressure required to force the mixture into the fracture increases but the initial amount will not exceed about one-half of the total batch of mixture during this first stage of the process. All pumping is ceased and the fluids and mixture are allowed to stand quiescent for a period of at least 15 minutes. Preferably, the period will be between 15 minutes and two hours. After the desired time interval, depending on pressure behavior, a second part of the mixture is forced into the fracture at the same low rate. The amount of mixture forced into the fracture during this second stage will depend on the pressure required to force the mixture into the fracture. Preferably, about 5 barrels of mixture will be forced into the fracture during the second stage. Again, the pumping is ceased and the mixture allowed to stand quiescent as the filter cake compacts and physically dehydrates. Similar volumes of mixture are forced into the fracture in stages and the process repeated until the filter cake is dehydrated and compacted to the extent that it will withstand future drilling pressures. This is determined at the surface by observing the pressure that it takes to force the mixture into the zone of lost circulation. This pressure, which is called a squeeze pressure, should exceed 100 p.s.i. and preferably should in most instances exceed over 500 p.s.i. A final squeeze pressure is required as illustrated by the following information. Thirty-two wells suffering lost circulation were treated with high filter cake forming mixture of this invention. Where there was a final squeeze pressure greater than 100 p.s.i., 82.3 percent of the treatments were considered successes. If there was little or no final squeeze pressure, only 20 percent of treatments could be termed successful. Indications are that the higher the squeeze pressure the more successful is the treatment and preferably the surface squeeze pressure should exceed 500 p.s.i.

Lost circulation is generally due to fracturing of weak formations. If such fractures are properly sealed, the formation will have enough strength to withstand future drilling pressures. It has been found that lost circulation may be efficiently cured by deliberately subjecting each potential zone of lost circulation to a pressure exceeding anticipated mud pressures. Squeeze pressures required normally do not exceed 1,000 p.s.i. over the maximum mud weight that will be employed before the well is completed. In carrying out this method a lost circulation control mixture is injected into the well bore each time a potential zone of lost circulation is reached. The mixture is pressurized to a pressure exceeding the expected drilling fluid mud pressures and if a fracture does occur, the mixture is utilized to seal the fracture. Preferably, this prevention process will employ the lost circulation control mixture of this invention and the fracture caused by pressurizing the mixture will be sealed as stated previously to withstand future drilling pressures. If each potential zone of lost circulation is not readily ascertainable, it is advantageous to periodically subject each interval of the borehole to the above-described pressure with the mixture of this invention.

It has been shown that in curing lost circulation the fluid-solid mixture must be able to form a thick filter cake that is readily physically dehydrated. It has also been pointed out that standard drilling muds tend to form an impermeable, thin filter cake on the walls of a porous or permeable formation. This impermeable filter cake if not removed could interfere with the processes just described, because the low fluid loss mud cake tends to retard formation of the permeable filter cake and greatly reduce the rate at which this filter cake is physically dehydrated. If this low fluid loss filter cake remained in place, the mixture of this invention might perform like prior lost circulation control fluids, that is, act like a low fluid loss mixture. Generally, it has been postulated that this impermeable mud cake is effectively removed from the walls of the fracture when the mixture of this invention is injected into the fracture, but some types of mud cakes may adhere to the walls of the fracture when the mixture is injected. It is, therefore, sometimes desirable to remove the impermeable mud cake by injecting either a portion of the mixture at a high rate or by injecting at a high rate a slug of a washing fluid, e.g., water or acid, or both, ahead of the mixture. When the impermeable mud cake is especially tenacious, a pretreatment with acid is desirable to degrade the mud cake and increase its permeability. Suitable mud acids are available, e.g., hydrochloric, sulfuric, hydrofluoric and the like. If desired, in areas of known lost circulation susceptibility and in areas where the low fluid loss drilling mud is especially tenacious, it may be desirable to add acid-soluble solid particles to the mud so that the acid more readily degrades the mud cake. Preferably, these acid-soluble particles will be chemicals that form a gas when reacting with acid. For example, calcium carbonate, barium carbonate, pure metals, and the like.

It has also been found that the lost circulation control mixture of this invention may adversely finger through any low water loss gelled mud left in the borehole. This is prevented by injecting a discrete volume of washing fluid, preferably water, ahead of the lost circulation control mixture.

Lost circulation frequently occurs in shale or sandy shale zones which are relatively impermeable. In the process for curing lost circulation as described in this invention, it is desirable to strengthen the formation so that it will withstand future drilling pressures. It has been found that by adding fresh water to the formation that shale formations are strengthened; therefore, in carrying out the above procedures, it is frequently desirable to inject a slug of a predetermined volume of fresh water at a slow rate ahead of the lost circulation control mixture of this invention so that the water will hydrate and strengthen the shale at the walls of the fracture and borehole before the lost circulation control mixture deposits its filter cake therein. In some instances, the pretreatment with fresh water should be carried out over a period of time by allowing the fresh water to soak opposite the formation and in the fractured zone of lost circulation. This permits the shale to hydrate to the maximum degree. This process has the added advantage of reducing the amount of lost circulation control mixture required since the fracture width will usually be reduced.

In relatively impermeable formations, the fluid-solid mixture of this invention will contain particles of from one-quarter inch to two inches in length so as to form a bridge within the fracture. Such bridge and the other particles collected on it act as a screen upon which the permeable filter cake of this invention is deposited and through which the permeable filter cake is physically dehydrated. In relatively impermeable zones, it should be noted that all of the fluid in the lost circulation control mixture must pass through a greater thickness of filter cake than it would need to do in a porous zone where fluid loss would be both lateral to the fracture and along the plane of the fracture. In relatively impermeable zones all of the fluid loss is lost along the plane of the fracture; therefore, the fluid must pass through a thicker filter cake. It is only with the lost circulation control mixture of this invention that the procedure of forming a bridge and depositing a filter cake thereon is at all practical. This illustrates that the filter cake must not only be quickly and efficiently formed in a thick manner, but that it should also be readily physically dehydrated so that fluid may pass therethrough. As the filter cake thickness increases, the rate of fluid loss through the filter cake is decreased until the desired squeeze pressure is obtained. At this point, the filter cake is sufficiently thick, sufficiently compacted and sufficiently dehydrated to form a permanent seal within the fracture which will not reopen during future drilling operations.

The invention has been described in detail in the foregoing and covers all of the variations suggested thereby which processes and compositions are to be limited only by the appended claims.

We claim:
1. During earth well bore drilling, a process for curing a lost circulation zone in a subsurface earth formation comprising injecting into said well bore a predetermined volume of a lost circulation control mixture of a fluid and solid particles, said mixture having a filter cake test thickness of at least 4.0 inches in a 30 minute modified API test so as to form a thick filter cake in said lost circulation zone, said filter cake being sufficiently permeable to allow added amounts of filter cake from said mixture to be deposited on and dehydrated through the filter cake already deposited in said lost circulation zone, forcing at time spaced intervals discrete volumes of said lost circulation control mixture into said lost circulation zone, each of said discrete volumes being separated by an interval of at least 15 minutes' duration, and continuing said discrete volumes until the pressure exerted by said lost circulation control mixture on said lost circulation zone exceeds a predetermined pressure.

2. The process of claim 1 wherein the lost circulation control mixture has a corresponding fluid loss of at least 300 cc. in a 30 minute modified API test.

3. The method of claim 2 wherein the solid particles of the lost circulation control mixture include solid filter aid particles.

4. The process of claim 2 wherein each discrete volume of said lost circulation control mixture is forced into said lost circulation zone at a rate of less than one-fourth barrel per minute until said predetermined pressure exceeds 100 p.s.i.

5. The method of claim 4 wherein the solid particles of the lost circulation control mixture include solid filter aid particles.

6. The process of claim 1 wherein the solid particles of the lost circulation control mixture include solid bridging particles adapted to bridge a fracture within the lost circulation zone, said bridging particles being between one-fourth and two inches long.

7. The method of claim 6 wherein the solid particles of the lost circulation control mixture include solid filter aid particles in addition to said bridging particles.

8. The process of claim 1 wherein there is injected just ahead of said lost circulation control mixture a predetermined volume of a washing fluid to prevent low fluid loss mud cake previously deposited in said lost circulation zone from interfering with said process.

9. The process of claim 8 wherein the washing fluid is acid.

10. The process of claim 8 wherein the washing fluid is water.

11. The process of claim 8 wherein the washing fluid is comprised of a first volume of acid and a second volume of water.

12. The process of claim 8 wherein the washing fluid is forced into the lost circulation zone at a rate of at least 4 barrels per minute.

13. The process of claim 8 wherein the washing fluid is fresh water.

14. During earth well bore drilling, a process for preventing lost circulation in a subsurface earth formation zone comprising injecting a lost circulation control mixture of fluid and solid particles into said well bore, pressuring said mixture against said zone to a fracturing pressure at least as great as anticipated drilling fluid pressure to be exerted on said zone, and sealing any fracture caused in said zone, said mixture having a filter cake test thickness of at least 4.0 inches in a 30 minute modified API test so as to form a thick filter cake in any fracture caused in said zone, said filter cake being sufficiently permeable to allow added amounts of filter cake from said mixture to be deposited on and dehydrated through the filter cake already deposited in said fracture.

15. The process of claim 14 wherein said lost circulation control mixture has a fluid loss of at least 300 cc. in a 30 minute modified API test.

16. The method of claim 15 wherein the solid particles of the lost circulation control mixture include solid filter aid particles.

17. A method of deep earth well bore drilling comprising circulating a drilling fluid containing acid-soluble particles, continuing said circulation of said drilling fluid until lost circulation occurs, injecting into said well bore a predetermined volume of an acid capable of reacting with said acid-soluble solid particles, injecting thereafter a predetermined volume of a lost circulation control mixture of fluid and solid particles, said mixture having a filter cake test thickness of at least 4.0 inches in a 30 minute modified API test so as to form a thick filter cake in said lost circulation zone, said filter cake being sufficiently permeable to allow added amounts of filter cake from said mixture to be deposited on and dehydrated through the filter cake already deposited in said lost circulation zone, forcing said acid into said lost circulation zone, forcing periodic discrete volumes of said lost circulation control mixture into said lost circulation zone, each of said periodic discrete volumes being spaced by intervals of at least 15 minutes, and continuing said periodic discrete volumes until the pressure exerted by said lost circulation control mixture on said lost circulation zone exceeds 100 p.s.i., thereafter renewing circulation of said drilling fluid.

18. The method of claim 17 wherein the lost circulation control mixture has a corresponding fluid loss of at least 300 cc. in a 30 minute modified API test.

19. The method of claim 18 wherein the solid particles of the lost circulation control mixture include solid filter aid particles.

References Cited by the Examiner
UNITED STATES PATENTS

| | | | |
|---|---|---|---|
| 2,124,495 | 7/1938 | Miller | 166—44 |
| 2,135,589 | 11/1938 | Monson | 166—44 |
| 2,308,425 | 1/1943 | Prince | 166—29 |
| 2,573,690 | 11/1951 | Cardwell et al. | 166—33 |
| 2,800,964 | 7/1957 | Garrick | 166—29 |
| 3,136,360 | 6/1964 | Ramos et al. | 166—33 X |

OTHER REFERENCES

Ruffin, D. R.: New Squeeze for Lost Circulation, in the Oil and Gas Journal, vol. 55, p. 96–97, Oct. 28, 1957.

Rogers, W. F.: Composition and Properties of Oil Well Drilling Fluids, Gulf Publishing Company, Houston, Texas, 1963, pages 676–677.

CHARLES E. O'CONNELL, *Primary Examiner.*